July 18, 1933.     W. A. REICHEL     1,919,129
TEMPERATURE CONTROL MEANS
Filed Jan. 27, 1932

INVENTOR
Wladimir A. Reichel.
BY Stephen Cerstvik
ATTORNEY

Patented July 18, 1933

1,919,129

UNITED STATES PATENT OFFICE

WLADIMIR A. REICHEL, OF BROOKLYN, NEW YORK, ASSIGNOR TO BENDIX AVIATION CORPORATION, OF SOUTH BEND, INDIANA, A CORPORATION OF DELAWARE

TEMPERATURE CONTROL MEANS

Application filed January 27, 1932. Serial No. 589,293.

The present invention relates to temperature or pressure responsive control devices and more particularly to devices responsive to the rate of change of temperature or pressure.

Devices embodying the invention are especially adapted to be employed for the purpose of controlling heating apparatus in accordance with the rate of change of temperature of such apparatus in order to maintain said temperature substantially constant to a greater degree than has heretofore been possible, although said devices may be employed in any case where it is desired to control temperature or pressure as in combustion control of furnaces or to control the flow of a heat conducting fluid such as steam.

Therefore, an object of the invention is to provide novel means for controlling temperature or pressure in accordance with the rate of change thereof. This and other objects of the invention will be apparent more fully hereinafter from a consideration of the detailed description which follows, taken together with the accompanying drawing wherein two embodiments of the invention are illustrated. It is to be expressly understood, however, that the drawing is merely for the purpose of illustration and description and is not designed as a definition of the limits of the invention, reference being had for this purpose to the appended claims.

In the drawing, wherein like reference numerals refer to like parts throughout the several views.

In accordance with the invention there is provided apparatus comprising a heat exchange element or absorber connected by suitable fluid conveying means, such as pipes, to a pressure responsive element or bellows and to a receiver or overflow chamber, the pipe which communicates with the overflow chamber having a restricted passage constituting a capillary orifice. The interior space of the apparatus is filled to a desired extent with a liquid medium having a relatively high coefficient of expansion. The heat exchange element or absorber is disposed in a region, the temperature of which is to be used to secure actuation of the pressure responsive element or bellows to exert an effect responsive to the rate of change of temperature in said region, thereby maintaining a desired temperature condition therein. For example, the pressure responsive element or bellows may be used to control the application of heat to the region so as to maintain a desired temperature or rate of change of temperature therein.

The apparatus of the present invention is to be distinguished from a thermostat which depends upon a predetermined temperature difference to render it effective. In the present instance the pressure developed by the highly expansive liquid upon a change in volume thereof, incident to a change in temperature, will be a function of the rate at which the temperature is changing, due to the fact that the flow through the restricted passage or capillary orifice is a function of time. By utilizing the rate of change of temperature the apparatus has an anticipating characteristic of operation which can not be obtained from devices of the thermostatic type, i. e., it is capable of producing a controlling force or effect before any substantial change in temperature takes place. Depending upon the design characteristics of the apparatus and on the purpose for which it is to be employed, it is capable of maintaining a constant desired temperature or of maintaining a uniformly increasing or decreasing gradient of temperature.

Figure 1:
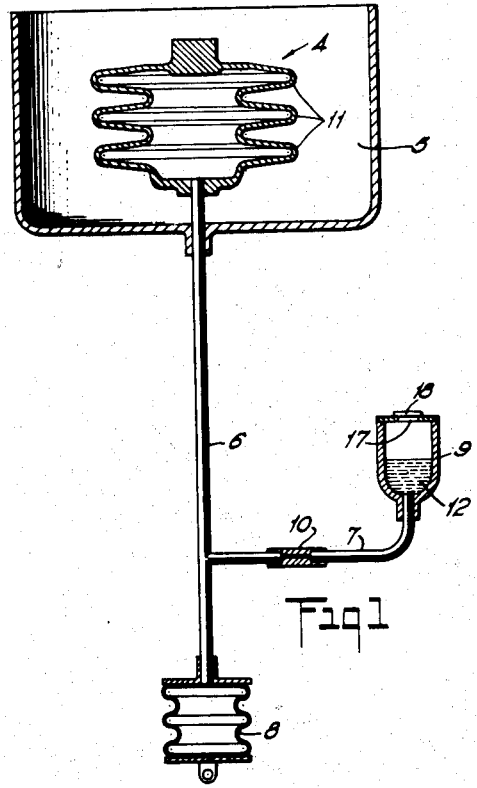
Fig. 1 is a diagrammatic view showing one embodiment of the invention.

Referring now to Fig. 1, in the form shown therein the apparatus embodying the invention comprises a heat exchange element or absorber 4 which is located within a region 5 and connected by fluid conducting means, such as pipes 6 and 7, to a pressure responsive device or bellows 8 and to an overflow chamber or receiver 9, respectively. The pipe 7 is provided with a restricted passage or capillary tube 10, whereby the pressure sensitive element 8 is rendered responsive to rate of change of temperature as will be pointed out more fully hereinafter. The heat exchange element or absorber 4 is provided with convolutions, ribs or radiating fins 11 so as to afford a greater surface exposed within the region 5, thereby providing an adequate heat transfer surface, and as pointed out hereinafter, the interior volume of the heat exchange element 11 is made as large as practicable as compared to the volume of the pipes and the pressure responsive device to promote responsiveness of the apparatus to small rates of temperature change. The interior space of the apparatus, such space consisting of the interior chambers of the heat exchange element 4, and of the pressure responsive device 8 of the pipes 6 and 7 and of at least a portion of the overflow chamber or receiver 9, is filled with a suitable liquid 12 having a relatively high coefficient of expansion such, for example, as gasoline, mineral spirits and the like. In the event that the apparatus is made of iron or steel, mercury may be employed.

Assuming now a change in temperature in the region 5, if the rate thereof causes a rate of change of volume or of expansion of the liquid in excess of the rate of flow permitted by the capillary tube 10, then a change in pressure occurs in the apparatus at the pressure responsive device and at the exchanger side of the capillary tube thereby causing an expansion or contraction of the bellows 8, the movement of which may be utilized for any desired purpose as, for example, for controlling the application of heat to the region 5. As soon as the temperature in the region 5 begins to change the volume of the liquid also begins to change and due to the orifice or capillary tube 10, the resulting pressure depends upon the rate of said change of temperature thereby producing a movement of the bellows 8, which is also a function of the rate of change of temperature.

By using a liquid having a high coefficient of expansion and making the heat exchanger volume as large as practicable as compared to the total volume of the pipes and pressure responsive device, and by choosing a sufficiently small orifice or capillary tube, very sensitive operation may be secured.

Figure 3:
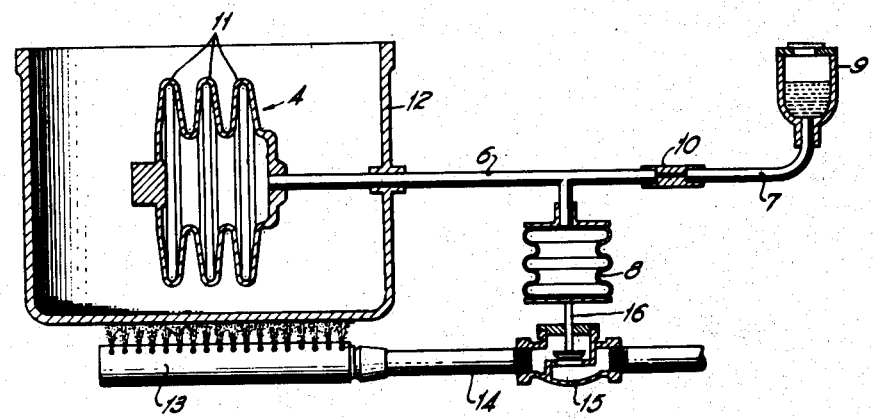
Fig. 3 is a diagrammatic view illustrating a practical application of the invention.

Referring now to Fig. 3, there is diagrammatically shown an application of the apparatus illustrated in Fig. 1, wherein the heat exchanger 4 is located in a chamber 12, which may be the fire-box of a furnace and has heat supplied thereto by means of a burner 13 which is supplied with suitable fuel through a pipe 14, and the latter may be connected to any suitable fuel supply (not shown).

Means are now provided for controlling the rate of fuel flow to the burner 13 and in the form shown comprise means such as a valve 15 connected in the pipe line 14 and having a valve stem 16 directly connected to the pressure responsive device or bellows 8, regulating the flow of fuel, and therefore the application of heat to the chamber 12, in accordance with the rate of temperature change in said chamber. The temperature in the chamber 12 may be maintained constant or it may be caused to increase or decrease uniformly as desired, depending upon the design characteristics selected for the apparatus. Assuming that the rate of temperature change should be in the direction of increasing temperature, then the pressure in the heat exchanger and at the pressure responsive device side of the capillary tube 10, would increase and cause expansion of the pressure responsive device or bellows 8, thereby decreasing the fuel supply. With the rate of change of temperature in the opposite direction, the pressure would be decreased and the rate of fuel supply would be correspondingly increased.

The pressure developed in the space defined by the heat exchanger 4, the bellows 8 and the connecting pipe line 6, depends upon the change in volume of the liquid therein. In other words, motion of the bellows 8 is brought about by the change in volume of said liquid. If the space referred to were closed then the apparatus would be effective only as an expansion device wherein the bellows would move to the extent of the volume change for a given temperature change; however, as such space is connected to the exterior through the overflow chamber 9 by means of the orifice or capillary tube 10, through the latter of which the flow is a function of time, then the change in volume of liquid in said space in excess of the capacity of the orifice or capillary tube will be a function of time and temperature, i. e., the expansion or contraction causing movement of the bellows 8 will depend upon the rate of change of temperature. If the flow through the orifice into the receiver 9 is at a rate below that necessary to take care of increasing volume of liquid due to increasing temperature, then such excess of volume depends upon the rate of change of temperature and the bellows expands. On the other hand if the volume of liquid at the heat exchanger and bellows side of the orifice diminishes at a rate faster than the rate of flow through the orifice incident to decrease in temperature, then the affected volume must contract depending upon the rate of change of temperature and the bellows will contract accordingly.

The apparatus shown in Fig. 1 is of the type where the pressure of the liquid in the apparatus is low, the receiver 9 being open to the atmosphere through an opening 17 covered by a suitable filter 18.

Figure 2:
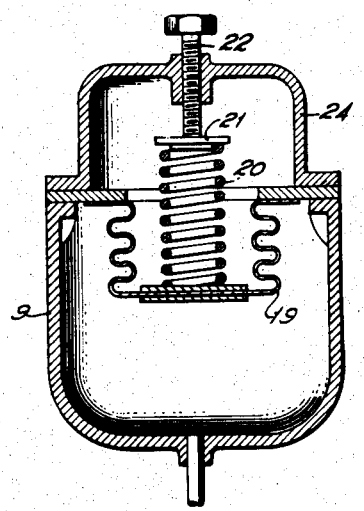
Fig. 2 is a diagrammatic view showing another embodiment of the invention.

Referring now to Fig. 2, there is shown an embodiment of the invention where varying or high back-pressures may be applied to the liquid in the receiver, i. e., instead of the receiver being open to the atmosphere it is closed and it has a bellows wall element 19 for expanding or contracting the volume of the receiver. Means are provided for varying the initial volume and hence the pressure of the liquid in the system, and in the form shown comprise a spring 20, one end of which abuts against the interior wall of the bellows 19, and the other of which abuts against a plate 21 carried by an adjusting screw 22 threaded in a cover 24, the latter of which closes the chamber 9. In this manner the initial pressure of the liquid in the system may be adjusted to atmospheric pressure or to any other pressure above or below atmospheric as desired.

From the foregoing it will be apparent that there is provided a novel temperature or pressure responsive control element whereby temperature or pressure may be controlled in accordance with the rate of change thereof, and embodying a structure which is relatively simple, requiring a minimum number of parts and therefore relatively inexpensive to manufacture.

While only two embodiments of the invention have been illustrated and described it will be obvious that other changes and modifications, which will now appear to those skilled in the art, may be made without departing from the scope of the invention. It will also be apparent that the control system may be employed in combination with apparatus other than that shown in Fig. 3. Reference is therefore to be had to the appended claims for a definition of the invention.

What is claimed is:

1. In temperature controlled apparatus responsive to the rate of change of temperature, a heat-exchanger member provided with an interior chamber, an expansible member having an interior expansible chamber, means including said chambers and a defining space containing an expansible fluid and having a single restricted passage affording communication between said space and a region externally thereof whereby, due to a difference of pressure created between the inside and outside of the expansible member upon a change in temperature, the fluid is caused to flow between the space and the external region in accordance with the rate of change of temperature to equalize said pressure difference, and a regulating device controlled by the rate of flow through said restricted passage.

2. In temperature controlled apparatus responsive to rate of change of temperature, a heat-exchange member provided with an interior chamber, an expansible member having an interior expansible chamber, means including said chambers and defining a space containing a liquid having a high coefficient of expansion, a reservoir for said liquid, a single pipe connecting said reservoir to said chambers and having a restricted passage whereby, due to a difference of pressure created between the inside and outside of the expansible member upon a change in temperature, the liquid is caused to flow between the reservoir and the space defined by the two chambers in accordance with the rate of change of temperature to equalize the pressure difference, and a regulating device controlled by the rate of flow through said restricted passage.

3. A temperature controlled apparatus responsive to rate of change of temperature, a heat-exchange member provided with an interior chamber, an expansible member having an interior expansible chamber, means including said chamber and defining a space containing liquid having a high coefficient of expansion, a reservoir for said liquid, means connecting said reservoir to the space defined by said chambers and including a restricted passage whereby, due to a difference of pressure created between the reservoir and the two chambers upon a change in temperature, the fluid is caused to flow through said restricted passage in accordance with the rate of change of temperature to equalize the pressure difference, means for adjusting the pressure in the reservoir so that the flow of liquid through the restricted passage occurs at a predetermined temperature, and a regulating device controlled by the rate of flow through said restricted passage.

4. A temperature controlled apparatus responsive to rate of change of temperature, a heat-exchange member provided with an interior chamber, an expansible member having an interior expansible chamber, means including said chamber and defining a space containing a liquid having a high coefficient of expansion, a reservoir for said liquid, means connecting said reservoir to the space defined by said chambers and including a restricted passage whereby, due to a difference of pressure created between the reservoir an the two chambers upon a change in temperature, the fluid is caused to flow through said restricted passage in accordance with the rate of change of temperature to equalize the pressure difference, means for adjusting the pressure in the reservoir whereby the flow of liquid through the restricted passage occurs at a predetermined temperature, and a regulating device operatively connected to the expansible member and controlled by the rate of flow through said restricted passage.

5. In combination, means for supplying heat to a region, a heat-exchange member in said region and provided with an interior chamber, an expansible member having an interior expansible chamber connected to the chamber of the heat-exchange member to define a space within which is contained a liquid having a high coefficient of expansion, a reservoir for said liquid, means connecting said reservoir to the space defined by the two chambers and including a restricted passage whereby, due to a difference of pressure created between the reservoir and the space defined by the two chambers upon change in temperature, the liquid is caused to flow between the reservoir and said space to equalize the pressure difference, and a regulating device operatively connected to and controlled by the expansible member for varying the heat supplied to the region in accordance with the rate of flow of the liquid through the restricted passage.

6. In combination, means for supplying heat to a region, a heat-exchange member in said region and provided with an interior chamber, an expansible member having an interior expansible chamber connected to the chamber of the heat-exchange member to define a space within which is contained a liquid having a high coefficient of expansion, a reservoir for said liquid, means connecting said reservoir to the space defined by the two chambers and including a restricted passage whereby, due to a difference of pressure created between the reservoir and the space defined by the two chambers upon change in temperature, the liquid is caused to flow between the reservoir and said space to equalize the pressure difference, means for adjusting the pressure in the reservoir whereby the flow of liquid through the restricted passage occurs at a predetermined temperature, and a regulating device operatively connected to and controlled by the expansible member for varying the heat supplied to the region in accordance with the rate of flow of the liquid through the restricted passage.

WLADIMIR A. REICHEL.